United States Patent
Breuner

(10) Patent No.: US 12,434,884 B1
(45) Date of Patent: Oct. 7, 2025

(54) SECURE MOBILE FOOD STORAGE DEVICE

(71) Applicant: Jeanette Kane Breuner, Gallatin Gateway, MT (US)

(72) Inventor: Jeanette Kane Breuner, Gallatin Gateway, MT (US)

(*) Notice: Subject to any disclaimer, the term of this patent is extended or adjusted under 35 U.S.C. 154(b) by 98 days.

(21) Appl. No.: 18/499,978

(22) Filed: Nov. 1, 2023

Related U.S. Application Data

(60) Provisional application No. 63/424,306, filed on Nov. 10, 2022.

(51) Int. Cl.
| | |
|---|---|
| *B65D 25/24* | (2006.01) |
| *B65D 25/06* | (2006.01) |
| *B65D 25/28* | (2006.01) |
| *B65D 43/22* | (2006.01) |
| *B65D 55/14* | (2006.01) |

(52) U.S. Cl.
CPC ............ *B65D 25/24* (2013.01); *B65D 25/06* (2013.01); *B65D 25/2805* (2013.01); *B65D 43/22* (2013.01); *B65D 55/14* (2013.01)

(58) Field of Classification Search
CPC .... B65D 25/24; B65D 25/06; B65D 25/2805; B65D 43/22; B65D 55/14; B65D 21/086; A45F 3/46
See application file for complete search history.

(56) References Cited

U.S. PATENT DOCUMENTS

| | | | | |
|---|---|---|---|---|
| 5,865,101 A | * | 2/1999 | Brown | A47J 36/38 99/410 |
| 7,604,290 B1 | * | 10/2009 | Giordano | A47C 3/32 297/188.1 |
| 2004/0206763 A1 | * | 10/2004 | Mann | A47B 85/08 220/660 |
| 2005/0279750 A1 | * | 12/2005 | Barquist | F16M 11/18 220/629 |
| 2016/0368130 A1 | * | 12/2016 | Bryant | B65F 1/14 |
| 2023/0013573 A1 | * | 1/2023 | McFadden | A47B 85/08 |

* cited by examiner

*Primary Examiner* — Shawn M Braden
(74) *Attorney, Agent, or Firm* — QuickPatents; Kevin Prince

(57) ABSTRACT

A storage device for use on a ground surface includes a container that has top, bottom, rear, left, right, and front sides. The front side includes at least one hinge at a lower edge thereof such that the front side can move between an upright closed position and a horizontal open position. At least three extendable legs are fixed with the container and are movable between retracted and extended configurations. Two handles may be included, preferably fixed with two extendable arms, each arm and the handle moveable between retracted and extended configurations. An internal storage volume of the container may include shelf grooves formed on inside surfaces of the left and right sides, at least one shelf being adapted to fit within each shelf groove to provide additional storage surface area within the internal storage volume of the storge device.

10 Claims, 2 Drawing Sheets

SECURE MOBILE FOOD STORAGE DEVICE

CROSS REFERENCE TO RELATED APPLICATIONS

This application claims the benefit of U.S. Provisional Patent Application 63/424,306, filed on Nov. 10, 2022, and incorporated herein by reference.

STATEMENT REGARDING FEDERALLY SPONSORED RESEARCH AND DEVELOPMENT

Not Applicable.

FIELD OF THE INVENTION

This invention relates to containers, and more particularly to a container having versatile features and for using on a ground surface.

BACKGROUND

Camping and other recreational activities require supplies such as non-perishable food, beverages, first aid, utensils and food preparation and other supplies. Typically people have used cardboard boxes, plastic bins, and insulated coolers for carrying such items into a campsite or other location. But such solutions leave much to be desired, as wild animals can often easily break open a cooler, inclement weather can destroy unprotected food and supplies, and bags or boxes present no challenge to a motivated rodent and no protection from storms.

Further, during food preparation it is convenient to have a table, preferably a counter-top height table of 32 to 38 inches. But with conventional means of carrying supplies, a separate table must be transported as well. Even a plastic fold-up table is somewhat cumbersome to transport.

Therefore, there is a need for a storage device that can easily latch closed and also be padlocked closed during travel or overnight. Such a needed device would provide a counter-top height working surface that has a stable wide base that is not easily tipped over. Multiple such storage devices could be placed adjacent with shelves between them to provide additional storage areas or working surfaces. The needed invention would be easily collapsible into an easy-to-carry container for transport or storage. The present invention accomplishes these objectives.

SUMMARY OF THE INVENTION

The present device is a storage device for use on a ground surface, such as during camping, for example. A container has a top side, a bottom side, a rear side, a left side, a right side, and a front side. All sides together define an internal storage volume therewithin.

The front side includes at least one hinge at a lower edge thereof such that the front side can move between an upright closed position and a horizontal open position. The container includes a front side stop for preventing the front side from opening beyond its 6 horizontal open position. As such, an inside surface of the front side forms a usable working surface.

At least one door latch is configured to allow for selective locking of the front side in the upright closed position. Further, the front side and one of the other sides, such as the top side of the container, both may include cooperative locking tabs that each include shackle apertures that align when the front side is in the upright closed position. As such, a shackle of a padlock may be inserted through each cooperative locking tab to lock the front side in the upright closed position, to protect any contents of the container from animals or the like.

At least three extendible legs are fixed with one of either the left side, the right side, or the rear side. Each leg is movable between a retracted configuration and an extended configuration. Preferably the at least three extendible legs are exactly four extendible legs. In such an embodiment, two of the legs are fixed with the left side of the container, and two of the extendible legs are fixed with the right side of the container. Preferably at least two of the extendable legs are angled such that when the extendible legs are in their extended configuration, distal ends of the extendible legs are mutually further apart from when the extendible legs are in their retracted configuration, creating a wider base and more stability for the container when the container is supported by the extendable legs.

Preferably each extendable leg, when in the retracted configuration, is substantially contained within a sheath that is mounted to the container. Such a sheath is preferably integrally formed with the container, preferably at the left side and the right side thereof.

In some embodiments, two handles are included, fixed between the sheaths of either the left side of the container or the right side of the container. Each handle is preferably fixed with two extendible arms, each arm and the handle moveable between a retracted configuration and an extended configuration.

In use, with each of the extendible legs in their extended configuration and resting on the ground surface, the at least one door latch can be actuated to unlock the front side of the container to access the internal storage volume therein.

In some embodiments the internal storage volume includes at least one pair of shelf grooves formed on inside surfaces, of the left side and the right side, respectively. The storage device further includes at least one shelf adapted to fit within each shelf groove so as to provide additional storage surface area within the internal storage volume of the storage device.

The present invention is a storage device that can easily latch closed and also be padlocked closed during travel or overnight. The present device provides a counter-top height working surface that has a stable wide base that is not easily tipped over. Multiple such storage devices can be placed adjacent with shelves between them to provide additional storage areas or working surfaces. The present invention is collapsible into an easy-to-carry container for transport or storage. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
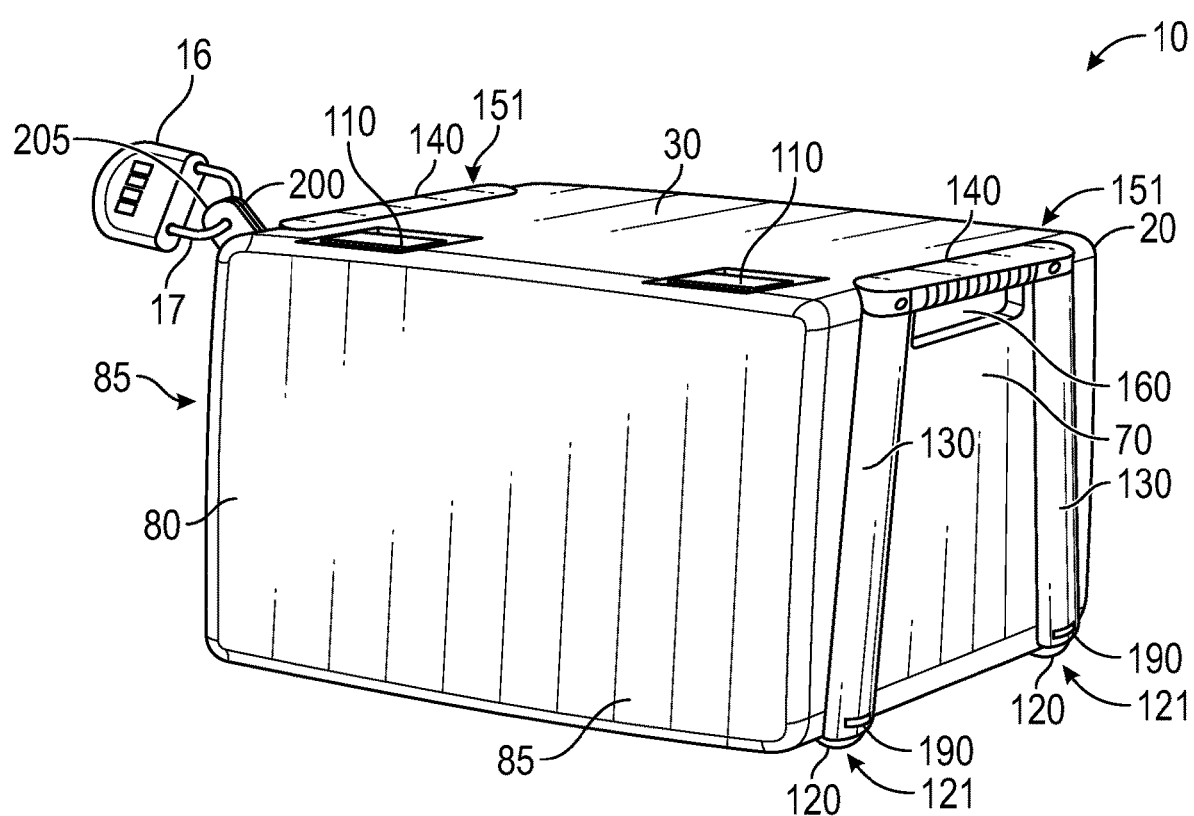
FIG. 1 is a front perspective view of the invention in a closed configuration.
Figure 2:
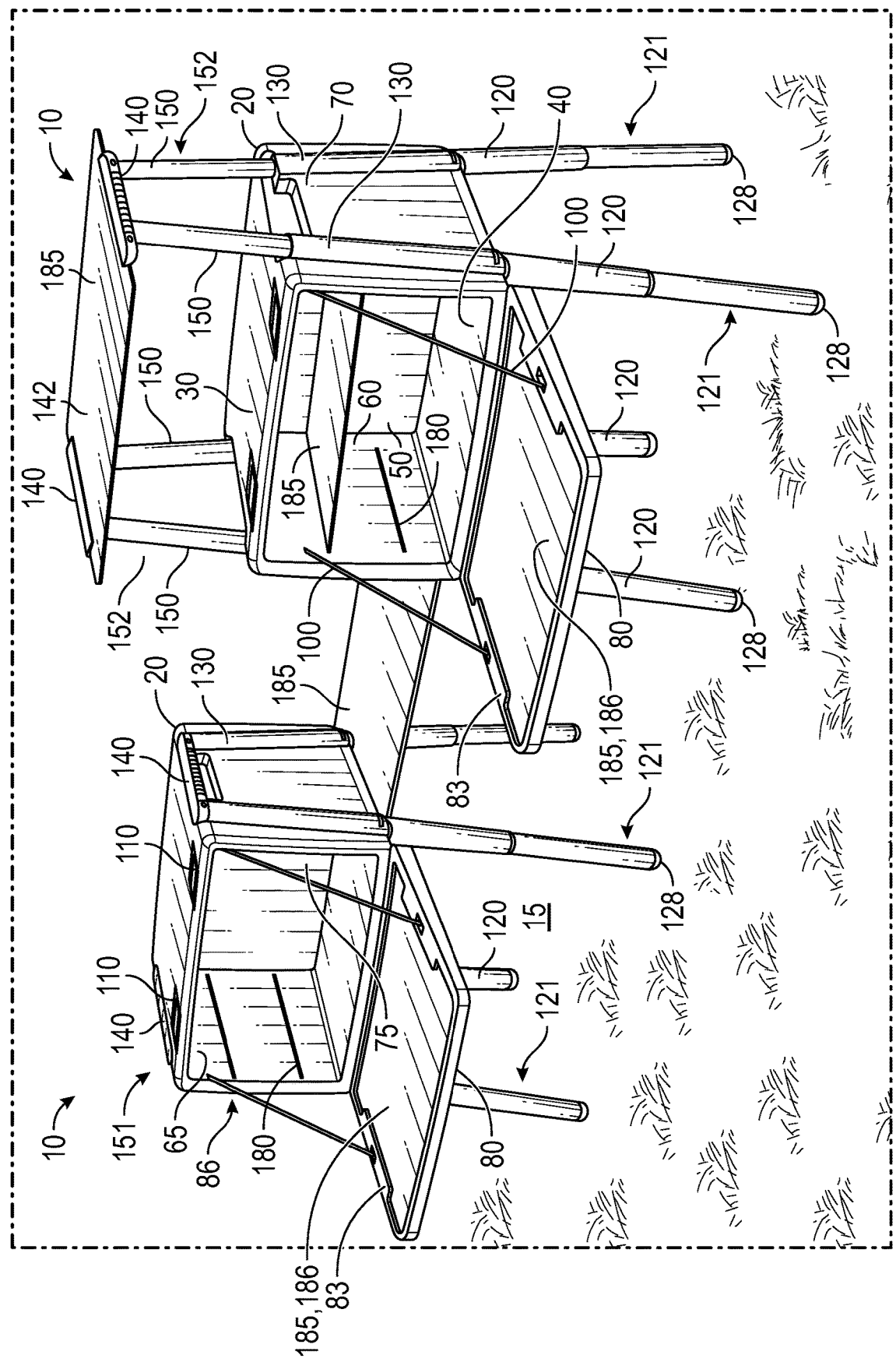
FIG. 2 is a front perspective view of the invention in an open configuration, illustrated with a shelf between two of the storage devices.

FIGS. 1 and 2 illustrate a storage device 10 for use on a ground surface 15, such as during camping for example. A container 20 has a top side 30, a bottom side 40, a rear side 50, a left side 60, a right side 70, and a front side 80. All sides 30,40,50,60,70,80 together define an internal storage volume 25 therewithin. All sides 30,40,50,60,70,80 are preferably made from a molded plastic material, but can also be made from a wood or metallic material.

The front side 21 includes at least one hinge 90 at a lower edge 82 thereof such that the front side 80 can move between an upright closed position 85 (FIG. 1) and a horizontal open position 86 (FIG. 2). The container 20 includes a front side stop 100 for preventing the front side 80 from opening beyond its horizontal open position 86. Such a stop 100 may be, for example, a pair of cords or chains as illustrated. As such, an inside surface 83 of the front side 80 forms a usable working surface.

At least one door latch 110 is configured to allow for selective locking of the front side 80 in the upright closed position 85. Further, the front side 21 and one of the other sides, such as the top side 30 of the container 20, both may include cooperative locking tabs 200 that each include shackle apertures 205 that align when the front side 80 is in the upright closed position 85. As such, a shackle 17 of a padlock 16 may be inserted through each cooperative locking tab 200 to lock the front side 21 in the upright closed position 85, to protect any contents of the container 20 from animals, inclement or wet weather, or the like.

At least three extendible legs 120 are fixed with one of either the left side 60, the right side 70, or the rear side 50. Each leg 120 is movable between a retracted configuration 121 and an extended configuration 122. Preferably the at least three extendible legs 120 are exactly four extendible legs 120. In such an embodiment, two of the legs 120 are fixed with the left side 60 of the container 20, and two of the extendible legs 120 are fixed with the right side 70 of the container 20. Preferably at least two of the extendable legs 120 are angled such that when the extendible legs 120 are in their extended configuration 122, distal ends 128 of the extendible legs 120 are mutually further apart from when the extendible legs 120 are in their retracted configuration 121, creating a wider base and more stability for the container 20 when the container 20 is supported by the extendable legs 120. Each extendable leg 120 is preferably telescoping, and is locked into its extended configuration 152 with either a spring-prong (not shown) that engages an aperture (not shown), as is known in the art, or a twist-lock mechanism (not shown) also known in the art, or the like. Each extendable leg 120 can be selectively, manually retracted based on the type of locking mechanism used, again as known in the art.

Preferably each extendable leg 120, when in the retracted configuration 121, is substantially contained within a sheath 130 that is mounted to the container 20. Such a sheath 130 is preferably integrally formed with the container 20, preferably at the left side 60 and the right side 70 thereof.

In some embodiments, two handles 140 are included, fixed between the sheaths 130 of either the left side 60 of the container 20 or the right side 70 of the container 20. Each handle 140 is preferably fixed with two extendible arms 150, each arm 150 and the handle 140 moveable between a retracted configuration 151 and an extended configuration 152. Each extendible arm 150, when in the retracted configuration 151, is preferably substantially contained within the sheath 130.

In use, with each of the extendible legs 120 in their extended configuration 122 and resting on the ground surface 15, the at least one door latch 110 can be actuated to unlock the front side 80 of the container 20 to access the internal storage volume 25 therein.

Preferably one leg extension actuator 160 is fixed with the right side 70 of the container 20, and another leg extension actuator 160 is fixed with the left side 60 of the container 20, both leg extension actuators 160 proximate the top side 30 of the container 20 and below the handles 140 when the handles 140 and the extendable arms 150 are in their retracted configurations 151. Each leg extension actuator 160 when depressed causes a mechanically coupled latch 170 of the container 20 to retract away from the extendable legs 120, thereby allowing the extendable legs 120 to fall into their extended configurations 152 by gravity. Preferably once each extendable leg 120 attains the extended configuration 152 each extendable leg 120 locks into the extended configuration 152 without having to manually lock each extendable leg 120.

In some embodiments the internal storage volume 125 includes at least one pair of shelf slots 180 formed on inside surfaces 65,75 of the left side 60 and the right side 70, respectively. The storage device 10 further includes at least one shelf 185 adapted to fit within each shelf slots 180 so as to provide additional storage surface area within the internal storage volume 125 of the storage device 10. The handles 140 may further include opposing shelf slots 180 formed on an inside surface 142 of the handles 140. Each sheath 130 may also include one or more of the shelf slots 180 formed therein proximate to the bottom side 40 of the container 20 and/or the top side 30 of the container 20. As such one of the at least one shelf 185 may be engaged with the shelf slot 180 of the sheaths 130 of two adjacent such storage devices 10. A shelf storage area 186 may be included on the inside surface 83 of the front side 80 for temporarily storing an unused shelf 185. The at least one shelf 185 is preferably made from a rigid plastic, metallic, or wood material.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A storage device for use on a ground surface, comprising:
   a container having a top side, a bottom side, a rear side, a left side, a right side, and a front side, all sides defining an internal storage volume therein, the front side including at least one hinge at a lower edge thereof such that the front side is configured to move between an upright closed position and a horizontal open position, the container including a front side stop for preventing the front side from opening beyond its horizontal open position;
   at least one door latch configured to selectively lock the front side in the upright closed position; and
   four extendable legs, each leg fixed with one of either the left side, the right side, or the rear side, each leg movable between a retracted configuration and an extended configuration, two of the extendible legs being fixed with the left side of the container, and two of the extendible legs being fixed with the right side of the container;
   wherein each extendible leg when in its retracted configuration is substantially contained within a sheath integrally formed with either the left side of the container or the right side of the container;
   two handles, each handle fixed between the sheaths of either the left side of the container or the right side of the container proximate the top side of the container;
   whereby with each of the extendable legs in their extended configuration and resting on the ground surface, the at least one door latch can be actuated to unlock the front side of the container to access the internal storage volume therein.

2. The storage device of claim 1 wherein each handle is fixed with two extendible arms, each arm and the handle movable between a retracted configuration and an extended configuration.

3. The storage device of claim 1 wherein each extendible arm when in its retracted configuration is substantially contained within the sheath.

4. The storage device of claim 1 further including two leg extension actuators, one fixed with the right side of the container and one fixed with the left side of the container, proximate the top side thereof and below the handle when the handle and extendible arms are in the retracted configuration, each leg extension actuator when depressed causing a mechanically coupled latch to retract away from the legs, thereby allowing the legs to fall into their extended configuration by gravity.

5. The storage device of claim 1 wherein the internal storage volume includes at least one pair of shelf grooves formed on inside surfaces of the left side and the right side of the storage device, the storage device further including at least one shelf adapted to fit within each shelf groove, whereby the at least one shelf can be fitted into the at least one pair of shelf grooves to provide additional storage surface area within the storage device.

6. The storage device of claim 1 wherein each handle includes an opposing shelf groove formed on an inside surface thereof, the storage device further including a shelf adapted to fit within each shelf groove of the handles.

7. The storage device of claim 1 wherein each sheath includes a shelf slot formed therein proximate the bottom side of the container, whereby a shelf is adapted to fit into the shelf slots of the container and the shelf slots of a second adjacent storage device.

8. The storage device of claim 1 wherein each sheath includes a shelf slot formed therein proximate the top side of the container, whereby a shelf is adapted to fit into the shelf slots of the container and the shelf slots of a second adjacent storage device.

9. The storage device of claim 1 wherein the front side and the top side of the container include cooperative locking tabs that each include shackle apertures that align when the front side is in the upright closed position, whereby the shackle of a padlock may be inserted through each tab to lock the front side in the upright closed position.

10. A storage device for use on a ground surface, comprising:
    a container having a top side, a bottom side, a rear side, a left side, a right side, and a front side, all sides defining an internal storage volume therein, the front side including at least one hinge at a lower edge thereof such that the front side is configured to move between an upright closed position and a horizontal open position, the container including a front side stop for preventing the front side from opening beyond its horizontal open position;

at least one door latch configured to selectively lock the front side in the upright closed position;

four extendable legs, two of the extendable legs being fixed with the left side of the container, and two of the extendable legs being fixed with the right side of the container, each leg movable between a retracted configuration and an extended configuration, each extendable leg when in its retracted configuration being substantially contained within a sheath integrally formed with either the left side of the container or the right side of the container;

two handles each fixed between the sheaths of either the left side of the container or the right side of the container proximate the top side of the container, each handle being fixed with two extendable arms, each arm and the handle movable between a retracted configuration and an extended configuration, each extendable arm when in its retracted configuration being substantially contained within the sheath;

two leg extension actuators, one fixed with the right side of the container and one fixed with the left side of the container, proximate the top side thereof and below the handle when the extendable arms are in their retracted configuration, each leg extension actuator when depressed causing a mechanically coupled latch to retract away from the extendable legs, thereby allowing the extendable legs to fall into their extended configuration by gravity;

the internal storage volume including at least one pair of shelf grooves formed on inside surfaces of the left side and the right side of the storage device;

at least one shelf adapted to fit within each shelf groove to provide additional storage surface area within the container;

each handle including an opposing shelf groove formed on an inside surface thereof, the at least one shelf adapted to fit within each shelf groove of the handles;

a shelf slot formed in each sheath proximate the bottom side of the container, and another shelf slot formed in each sheath proximate the top side of the container, the at least one shelf adapted to fit into one of the shelf slots of each sheath and the shelf slots of the sheaths of a second adjacent storage device; and the front side and the top side of the container including cooperative locking tabs that each include shackle apertures that align when the front side is in the upright closed position;

whereby with each of the extendable legs in their extended configuration and resting on the ground surface, the at least one door latch can be actuated to unlock the front side of the container to access the internal storage volume therein, and whereby with the front side of the container in the upright closed position, a shackle of a padlock may be inserted through each tab to lock the front side in the upright closed position.

* * * * *